United States Patent

[11] 3,609,083

| [72] | Inventor | Paul Irving Slick<br>Allentown, Pa. |
|---|---|---|
| [21] | Appl. No. | 20,416 |
| [22] | Filed | Mar. 17, 1970 |
| [23] | | Division of Ser. No. 684,628,<br>Nov. 21, 1967 |
| [45] | Patented | Sept. 28, 1971 |
| [73] | Assignee | Bell Telephone Laboratories, Incorporated<br>Murray Hill, N.J. |

[54] HEAT TREATMENT OF NICKEL ZINC COBALT FERRITE
8 Claims, No Drawings

| [52] | U.S. Cl. | 252/62.62 |
|---|---|---|
| [51] | Int. Cl. | C04b 35/30 |
| [50] | Field of Search | 252/62.62,<br>62, 56, 64 |

[56] References Cited
UNITED STATES PATENTS

| 2,989,472 | 6/1961 | Eckert et al. | 252/62.62 |
|---|---|---|---|
| 3,242,089 | 3/1966 | Bartow et al. | 252/62.62 |

*Primary Examiner*—Robert D. Edmonds
*Attorneys*—R. J. Guenther and Edwin B. Cave

ABSTRACT: This is a method for improving the magnetic properties, and in particular the product of the permeability and the quality factor, for a nickel zinc cobalt ferrite, within the frequency range of 1.5 to 20 megahertz. It is a heat treatment consisting of the steps of; precooling, comprising either rapid cooling or cooling in an oxygen-poor atmosphere to a temperature above the Curie point and thereafter slowly cooling to room temperature in an oxygen-rich atmosphere. The resulting product is useful as a core material in inductors at high frequency.

HEAT TREATMENT OF NICKEL ZINC COBALT FERRITE

This is a division of application Ser. No. 684,628, filed Nov. 21, 1967.

BACKGROUND OF THE INVENTION

1. Field of the Invention

This invention relates to a method for heat treatment of a ferrite which results in a high $\mu Q$ value and for inductors containing the ferrite as a core material, to the resulting material.

2. Description of the Prior Art

The use of metals as core materials in inductors is restricted at higher frequencies due to high losses. These losses are primarily caused by eddy currents. Thus, when it was discovered that nonmetallic materials such as the spinel ferrites exhibited ferromagnetic properties, these materials began to be used as core materials at these higher frequencies because they exhibited lower losses than the metals. This partially due to the fact that nonmetals have a higher specific resistance and thus eddy currents are substantially reduced. A low loss material has been defined as one having a high quality factor. This is expressed by the following equation:

$$Q = 2\pi f L / R_m$$

where $L$ is the series inductance of the coil with its intended magnetic core, $f$ is the frequency of the exciting magnetic filed, and $R_m$ is the effective series resistance arising from the core loss in the material.

The value of the permeability $\mu$ is also important in core materials since it determines the magnitude of inductance. Thus, a high $\mu Q$ product is generally recognized as a desirable property of core material. Certain nickel zinc cobalt ferrites have been found to have acceptable permeability and high quality factors at frequencies up to 1.5 megahertz. Due to these high quality factors, nickel zinc cobalt ferrites are likely candidates for use as core materials inductors at higher frequencies, that is, within the range of 1.5 to 20 megahertz. It is generally recognized, however, that it is difficult to obtain a high $\mu Q$ product within the range of frequencies of 1.5 and 20 megahertz for these materials because $\mu Q$ generally tends to fall in value as frequency increases.

Modification of these materials for the purpose of improving or varying magnetic or electrical properties is well known in the art and sometimes takes the form of a postfiring heat treatment. For example, varying $\mu$ and Q for NiZnCo ferrites by annealing from a temperature of approximately 300° C. at a cooling rate of up to 60° C./hour is described in U.S. Pat. No. 3,242,089, issued to Barton and Head on Mar. 22, 1966. This was done in order to be able to vary $\mu$ and Q after the inductor cores has already been fired and ground to size.

However, since $\mu Q$ decreases with increasing frequency, their value would become too low for many inductor applications at frequencies within the range of 1.5 to 20 megahertz. For example, in devices used in frequency transmission circuits which are designed to filter out or attenuate certain frequencies, the degree to which only the desired frequencies are allowed to pass, that is, the order of discrimination, depends upon the quality factors of the inductors. A high quality factor yields a high order of discrimination. Generally, such filters for use within the frequency range specified have heretofore been impractical due to lack of a suitable core material. While such filters could be designed to include inductors having air cores, thus minimizing losses, their size would become prohibitive. This is due to the necessity of increasing the size of the inductor coils to obtain suitable inductance values, and of shielding the coils from the remainder of the circuit. While such air coils would have an outside diameter of from 2 to 4 inches and a height of from 2½ to 5 inches, coils with ferrite cores would have an outside diameter of from three-eighth to five-eighth inch and a height of from one-fourth to one-half inch.

The present invention significantly improves the $\mu Q$ product over the prior art for certain nickel zinc cobalt ferrites, by means of a novel heat treatment method, enabling their use a frequencies within the range of 1.5 to 20 megahertz.

SUMMARY OF THE INVENTION

This is a method for obtaining certain nickel zinc cobalt ferrites with improved $\mu Q$ product for use within the frequency range of 1.5 to 20 megahertz. The method is a heat treatment following firing consisting of the following steps: Precooling, comprising either rapid cooling in any atmosphere or cooling in an oxygen-poor atmosphere containing from 0.7 to 10 percent oxygen, remainder nitrogen or any substantially inert nonreactive gas, down to a temperature above the Curie point, and within the range of from 475° C. to 700° C.; followed immediately by the optional step of quenching to a temperature below 300° C.; followed by annealing in air or other oxygen-bearing atmosphere containing at least 18 percent oxygen, from a temperature of from 475° C. to 700° C. at a cooling rate of up to 100° C. per hour.

DETAILED DESCRIPTION

The methods of preparation of materials for final firing to produce a ferrite are well known in the art, and are not a necessary part of this description. The following description is intended to set forth a preferred embodiment for preparation, which may be varied in practice without departing from the scope of the invention, as disclosed in the accompanying description and appended claims. Powdered materials, as oxides or other compounds which, with firing, will yield the oxides, such as iron oxide, nickel carbonate, cobalt carbonate, and zinc oxide, are weighed out in such proportion as to give a final material within the range of compositions shown in table I.

TABLE I

|  | Atom Percent of Metal |
|---|---|
| Iron | 72–82 |
| Nickel | 10–27 |
| Zinc | 1–13 |
| Cobalt | 0.4–1.2 |

They are thoroughly mixed to insure that subsequent reactions take place completely and uniformly. This mixing usually carried out by forming a slurry with water in a ball mill. This step can also serve to reduce the powdered materials to the desired grain size. The material is then dried, and calcined at a temperature of from 800° to 1,100° C. for from 2 to 16 hours. Ball milling is again carried out after the calcining step in order to break up the agglomerations formed during calcining and in order to further insure a completely homogeneous mixture. This is usually done for a period of from 5 to 15 hours, in a carrier such as water, acetone, ethanol, or carbon tetrachloride. Typically a binder is added during ball milling. Although not so limited, conventional binders include polyvinyl alcohol or hydrogenated castor oil for a water carrier and paraffin (chlorinated naphthalene) for organic carriers. If polyvinyl alcohol is used as a binder, it is preferred to add it to the slurry after ball milling is completed, however, because of its tendency to cause foaming of the slurry during ball milling. A deflocculating agent such as gum arabic will tend to counteract such foaming of the slurry, but will not prevent it entirely. Pressing aids such as zinc stearate emulsion and zinc stearate powder may also be added after calcining, the emulsion being added to the slurry, and the powder being added to the subsequently dried material.

A zinc stearate emulsion is added in the amount of from 0.5 to 2.0 percent by weight of the calcined powder and zinc stearate powder is added in the amount of from 0.1 to 0.5 percent by weight of the calcined powder. The addition of a deflocculant, such as gum arabic, is desirable, and is usually present in the amount of from 0.5 to 2.0 percent by weight of the calcined powder.

Both the emulsion and the powder are desired additions, since they are generally known to perform different functions as pressing aids due to their different physical forms.

Good results are obtained when these ferrites are formed of the purest ingredients with the least inclusion of impurities or modifying ingredients. However, when the material is formed of commercial substances, there will ordinarily be small amounts of impurities present but such impurities should ordinarily be kept below about 0.5 percent total. Particularly harmful is the presence of large amounts of silicon, which is preferably not present in amounts greater then about 0.04 percent. However, small amounts of silicon are generally thought to be desirable. Likewise, a small addition of calcium oxide to the slurry, for 0.05 to 0.15 percent by weight, is also desirable in that it increases the resistivity of the final fired body, thus improving further the quality factor. Over 0.15 percent has a deleterious effect on the quality factor, however.

Drying the slurry to powder is the next step. Spray drying is preferred because it is thought to improve flowability of powder being pressed into green bodies. The material is next shaped into the desired configuration under a pressure of from 3 to 25 tons per square inch, to a size which allows for subsequent shrinkage during firing. The material in this state is ready for firing. It is fired at a temperature between 1,100° to 1,250° C., above which temperature range the volatilization of zinc becomes appreciable, and below which the time required for densification becomes excessive. The final $\mu Q$ product is substantially independent of firing atmosphere and firing time within the range of 3 to 12 hours. Each of the remaining steps is critical to obtaining a high $\mu Q$ product. The first of these steps, known as precooling, has as its object of minimization of oxygen contact with the surface of the ferrite, and may be carried out either by rapid cooling or cooling in an oxygen-poor atmosphere. Precooling is carried out from the firing temperature to a temperature above the Curie point, within the range of 475° to 700° C. The Curie temperature is defined as the temperature above which the spontaneous magnetization $M_s$ vanishes fairly suddenly. While the Curie temperature will never fall below 450° C. for the range of compositions specified, it may become higher then 450° C. For example, as the amounts of iron and nickel are increased, the Curie temperature will increase to as high as 585° C. However, as the amount of zinc is increased, the Curie temperature will decrease, but not below 450° C. for the zinc contents given above. Cobalt additions, being small, have a negligible effect on the Curie temperature.

Cooling to a temperature above 700° C. necessitates the introduction of the next step above this temperature, which results in a detrimental effect on the final $\mu Q$ product.

Rapid cooling may be at a rate of from 400° C. per hour to 2,000° C. per hour, below which the minimization of oxygen contact with the surface of the ferrite is insufficient for obtaining an optimum $\mu Q$ product and above which cracking of the fired ferrite body becomes a problem. If cooling in an oxygen-poor atmosphere is substituted for rapid cooling, the amount of oxygen in the atmosphere which is tolerable depends upon the rate of cooling. Generally, the rate of cooling may vary from 30° C. per hour to 400° C. per hour and the oxygen content from 0.7 to 10 percent oxygen in an atmosphere whose remainder is nitrogen or other substantially inert nonoxidizing atmosphere. The smaller amount of oxygen corresponds to the slower cooling rate and the larger amount of oxygen corresponds to the faster cooling rate.

The second step which is critical to the obtaining of an optimum $\mu Q$ product is slow cooling or annealing in an atmosphere containing at least 18 percent oxygen from a temperature above the Curie point within the range of 475° to 700° C. The cooling rate has no lower limit. The $\mu Q$ product increases exponentially as the cooling rate decreases. The cooling rates above 30° C. per hour produce $\mu Q$ products below 20,000 at a frequency of 15 megahertz and cooling rates above 100° C. per hour produce a negligible improvement in $\mu Q$ product over rapid cooling. The parts are extracted from the furnace at any temperature below 250° C.

If it is necessary to machine the material after firing in order to modify its physical dimensions, this must be done before annealing since machining has a deleterious effect on the final $\mu Q$ product. In order to bring the cores to a suitable condition for machining, it has been found necessary to rapid cool or quench the pieces following the step of rapid cooling or cooling in an oxygen-poor atmosphere. The cores must be cooled at a rate of from 400° to 2,000° C. per hour to a temperature below 400° C. It is preferred to carry out this quenching to a temperature below 300° C., however, in order to obtain optimum values for $\mu Q$. After machining the cores are then reheated to a temperature between 475° and 700° C. and subjected to annealing as described above.

It is important not to begin annealing below 475° C. since this would not result in an optimum $\mu Q$ product. It is likewise important not to begin annealing above 700° C. since this would result in loss of the beneficial effect of rapid cooling or cooling in oxygen-poor atmosphere, following firing. It is thus preferred to begin annealing as much below 700° C. as possible, to provide a safe margin against loss of the effect of the previous steps. However, annealing must always begin above the Curie temperature. While the mechanism is not entirely understood, it is essential to have a deficiency of oxygen above 700° C. and at east 18 percent oxygen below 700° C., that is, during annealing. The combination of precooling, and subsequent annealing, is essential to the optimum $\mu Q$ product.

EXAMPLE 1

Powdered zinc oxide, ZnO, cobalt carbonate, $CoCO_3$, nickel carbonate, $NiCO_3$ and iron oxide, $Fe_2O_3$, were combined so that the atom percent of the metals in the final fired material, including an allowance for about 1 percent of iron pickup from ball milling was as follows:

| | |
|---|---|
| Iron | 74.4 |
| Nickel | 15.0 |
| Zinc | 10.0 |
| Cobalt | 0.6 |

The materials were combined with an equivalent weight of distilled water, and the mixture transferred to a steel ball mill and milled for one hour. A piece of hardened filter paper was wetted and placed in a funnel. It was filtered to a solid cake. The cake was dried at 120° C. for 12 hours, pulverized, and calcined at 900° C. for 16 hours in air. To this material was then added 0.056 percent by weight of starting materials of calcium oxide, 1.0 percent of gum arabic and 60.0 percent of distilled water. The resultant mixture was ball-milled for 7½ hours. A zinc stearate emulsion was added in the amount of 1.5 percent, and the mixture was milled for an additional one-half hour. To the resulting slurry was added 1 percent by weight of polyvinyl alcohol (20 percent solution) and the combination was mixed for 15 minutes. The material was then spray-dried and blended by means of granulation with 0.25 percent by weight of zinc stearate powder so that the resulting mixture passed an 80-mesh screen but was held by a 325-mesh screen. The powder was pressed at about 15 tons per square inch to a green density of about 2.8 grams per cubic centimeter. It was then fired according to the following schedule. It was heated to 1,220° C., maintained at this temperature for 6 hours. The parts were precooled to 700° C. from which temperature they were quenched. This firing and cooling was carried out in an atmosphere containing 5 percent oxygen, remainder nitrogen. The material was then heated to 550° C. and cooled at a rate of 8° C. per hour, and the parts were extracted at room temperature. This cycle was carried out in an air atmosphere. The magnetic properties of the resulting core materials at 15 megahertz were as follows: Permeability was 48, the product of $\mu$ and Q was 25,000 and the fired density was 3.9 grams per cubic centimeter.

EXAMPLE 2

The same procedure as in example 1 was carried out except that the annealing rate was 30° C. per hour.

At a frequency of 15 megahertz, permeability was 58, the product of $\mu$ and Q was 20,000 and the fired density was 3.9 grams per cubic centimeter.

The invention has been described with reference to particular embodiments thereof, but it is intended that variations therefrom which basically rely on the teachings of the invention are to be considered as within the scope of the description and the appended claims.

What is claimed is:

1. A method for obtaining a nickel zinc cobalt ferrite having a high $\mu Q$ product comprising the steps of:
   1. slurrying with water, drying and calcining a mixture comprising components having a cation content equivalent to 72 to 82 atom percent iron, 10 to 27 atom percent nickel, 1 to 13 atom percent zinc and 0.4 to 1.2 atom percent cobalt;
   2. shaping the resultant material under pressure into the desired configuration; and
   3. firing the shaped material at a temperature of from 1,100° to 1,250° C.; characterized in that firing is followed immediately by:
   4. precooling to a temperature of from 475° to 700° C., said precooling consisting of cooling in an oxygen-poor atmosphere containing from 0.7 to 10 percent oxygen, remainder substantially gases which are nonreactive with respect to the surface of the ferrite said precooling being carried out at the rate of from 30° C. per hour to 400° C. per hour, the smaller amount of oxygen corresponding to the slower cooling rate and the larger amount of oxygen corresponding to the faster cooling rate; and
   5. further characterized in that said steps are followed by annealing which consists of slowly cooling the material from a temperature of from 475° to 700° C. at a rate of up to 100° C. per hour in an atmosphere containing at least 18 percent oxygen, remainder substantially gases which are nonreactive with respect to the surface of the ferrite.

2. The method of claim 1 in which the material is fired for a period of from 3 to 12 hours.

3. The method of claim 1 in which the cooling rate during annealing is up to 30° C. per hour.

4. The method of claim 1 in which the step of annealing is carried out to a temperature of 250° C.

5. The method of claim 1 in which precooling is followed immediately by quenching to a temperature below 400° C. at a cooling rate of from 400° C. per hour to 2,000° C. per hour, followed by machining of the ferrite material, followed by annealing.

6. The method of claim 5 in which the starting temperature for annealing is 550° C. ±50° C. for a ferrite comprising components having a cation content equivalent to 73 to 76 weight percent iron, 3 to 17 weight percent nickel, 8 to 12 weight percent zinc and 0.4 to 0.8 weight percent cobalt.

7. The method of claim 5 in which the step of quenching is carried out to a temperature below 300° C.

8. The method of claim 1 in which the step of calcining is carried out at a temperature of from 800° to 1,100° C. for a time of from 2 to 16 hours in air.